United States Patent [19]
Rahikainen et al.

[11] Patent Number: 6,085,080
[45] Date of Patent: Jul. 4, 2000

[54] REJECTION OF INCOMING AND OUTGOING CALLS IN WLL TERMINAL

[75] Inventors: Ilkka Rahikainen; Erkki Juntunen; Marko Nousiainen; Juha Kinnunen; Heikki Galla; Tanja Leinonen, all of Oulu, Finland

[73] Assignee: Nokia Mobile Phones Limited, Espoo, Finland

[21] Appl. No.: 08/882,821

[22] Filed: Jun. 26, 1997

[51] Int. Cl.[7] .................................................... H04Q 4/32
[52] U.S. Cl. ......................................... 455/403; 455/425
[58] Field of Search .................................... 455/403, 425

[56] References Cited

U.S. PATENT DOCUMENTS

| | | | |
|---|---|---|---|
| 4,122,304 | 10/1978 | Mallien, II | 179/2 EB |
| 4,220,820 | 9/1980 | Mallien, II | 179/2 EB |
| 4,508,935 | 4/1985 | Mastromoro | 179/2 EA |
| 4,658,096 | 4/1987 | West, Jr. et al. | 379/59 |
| 4,718,080 | 1/1988 | Serrano et al. | 379/59 |
| 4,737,975 | 4/1988 | Shafer | 379/58 |
| 4,775,997 | 10/1988 | West, Jr. et al. | 379/59 |
| 4,959,851 | 9/1990 | Tobolski, Jr et al. | 379/59 |
| 5,016,002 | 5/1991 | Levanto | 340/756 |
| 5,263,178 | 11/1993 | Liukkonen | 455/76 |
| 5,353,328 | 10/1994 | Jokimies | 379/58 |
| 5,392,282 | 2/1995 | Kiema | 370/77 |
| 5,446,772 | 8/1995 | Korhonen | 375/36 |
| 5,452,354 | 9/1995 | Kyronlahti et al. | 379/375 |
| 5,475,735 | 12/1995 | Williams et al. | 455/403 |
| 5,479,476 | 12/1995 | Finke-Anlauff | 379/58 |
| 5,490,235 | 2/1996 | Von Holten et al. | 395/2.79 |
| 5,819,177 | 10/1998 | Vucetic et al. | 455/425 |

OTHER PUBLICATIONS

"Public Switched Telephone Network (PSTN); Subscriber line protocol over the local loop for display (and related) services; Part 1: On hook data transmission", ETSI, prETS300 659–1, Dec. 1995.

Carlson Wirless Telephone, Incorporated, "i–WLL" Jul. 1999.

ECI Telecom, "Fixed Wireless Solutions" Jul. 1999.

Nokia, "Nokia Wireless Local Loop Solutions" Jul. 1999.

*Primary Examiner*—William Cumming
*Attorney, Agent, or Firm*—Ohlandt, Greeley, Ruggiero & Perle, L.L.P.

[57] ABSTRACT

A WLL subscriber unit (1) includes a telephone (2) that is bidirectionally coupled to a wireless transceiver (11) through a teleadapter (10). The WLL subscriber unit further includes a user interface and a data processor coupled to a memory and to the user interface for prompting a user to enter information into the WLL subscriber unit, for receiving the entered information, and for storing the entered information in the memory. The data processor is responsive to the stored information for controlling the operation of the WLL subscriber unit to accept or reject at least one of specified incoming calls or outgoing calls. In one embodiment the user interface includes a keypad of the telephone, in another embodiment the user interface includes a speech recognition function, in a further embodiment the user interface includes a speech synthesis function, and in one further embodiment the user interface includes a data port for connecting the WLL subscriber unit to an external data processor. The memory is a non-volatile memory that stores a plurality of different lists, including an incoming call rejection list, an outgoing call rejection list, and an outgoing group call rejection list. The WLL subscriber station is responsive to a telephone number dialed by a user or received from the wireless network for comparing all or a portion of the number to at least one of the stored lists, and for rejecting a call that matches a stored telephone number or portion of a telephone number.

15 Claims, 7 Drawing Sheets

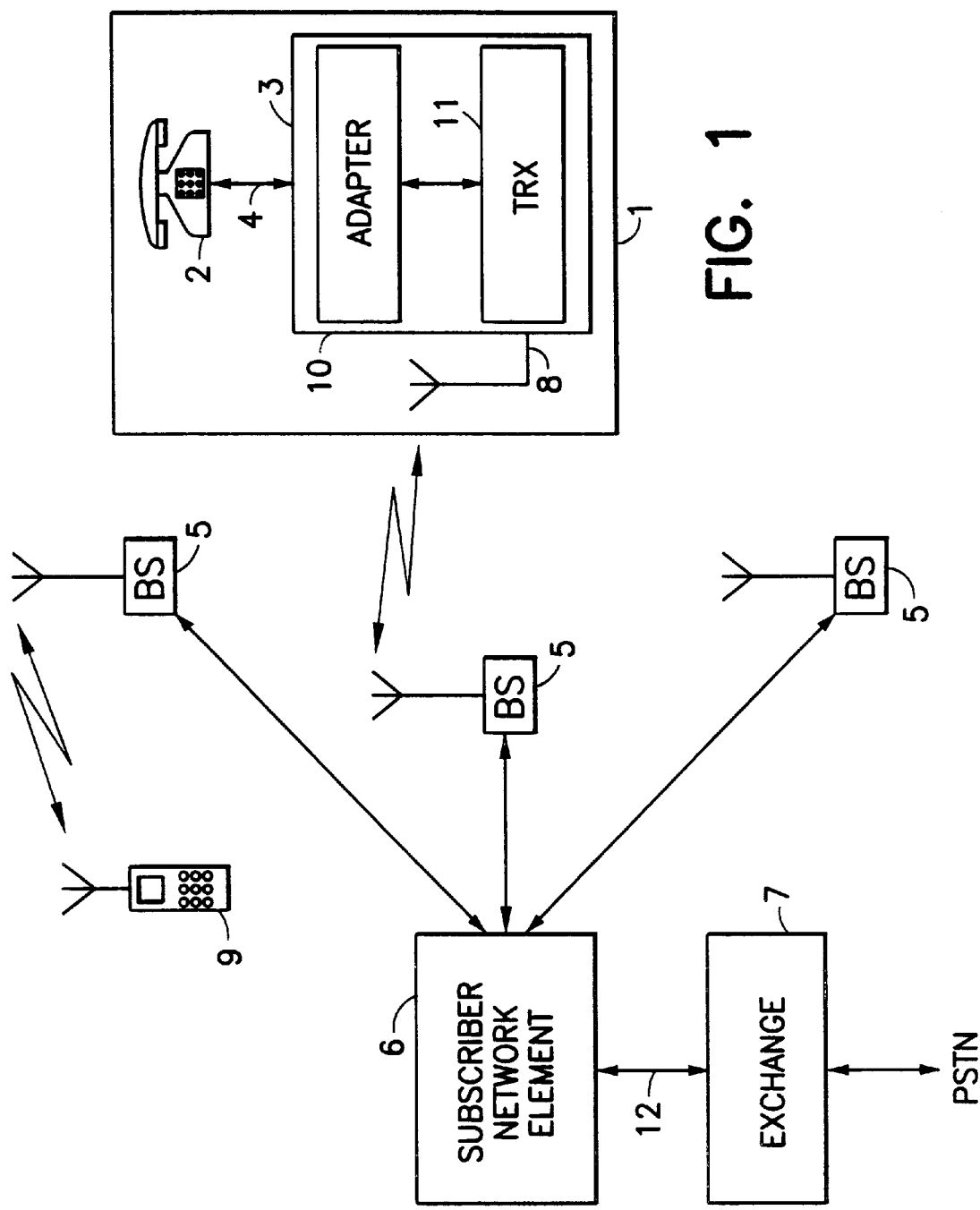

6,085,080

REJECTION OF INCOMING AND OUTGOING CALLS IN WLL TERMINAL

FIELD OF THE INVENTION

This invention relates generally to wireless communications systems and, in particular, to Wireless Local Loop (WLL) telecommunications systems.

BACKGROUND OF THE INVENTION

Terminal equipment used in wireless local loop (WLL) networks includes a conventional telephone that is linked to the public telephone network through a wireless transceiver unit. In many cases the transceiver unit is linked to a cellular telecommunication system through radio channels. Using the WLL system a user is enabled to make and receive telephone calls as though connected directly to the public telephone network.

The following U.S. Patents are illustrative of WLL and similar systems: U.S. Pat. No. 4,122,304 entitled "Control Circuitry For A Radio Telephone" by Mallien, II; U.S. Pat. No. 4,220,820 entitled "Control Circuitry For A Radio Telephone" by Mallien, II; U.S. Pat. No. 4,508,935 entitled "Cordless Telephone Having A Remote Control Function" by Mastromoro; U.S. Pat. No. 4,658,096 entitled "System For Interfacing A Standard Telephone Set With A Radio Transceiver" by West, Jr. et al.; U.S. Pat. No. 4,718,080 entitled "Microprocessor Controlled Interface For Cellular System" by Serrano et al.; U.S. Pat. No. 4,737,975 entitled "Programmable System For Interfacing A Standard Telephone Set With A Radio Transceiver" by Shafer; U.S. Pat. No. 4,775,997 entitled "System For Interfacing A Standard Telephone Set With A Radio Transceiver" by West, Jr. et al.; and U.S. Pat. No. 4,959,851 entitled "Dialing Features For Cellular Telephone With Standard Telephone Set" by Tobolski, Jr. et al.

A problem encountered in WLL systems relates to the generally quality of the user interface. For example, many modern cellular telephones and personal communicators include a display (typically a LCD display), a keypad for entering alphanumeric characters, and a plurality of other special purpose keys and programmable keys (e.g., "soft keys") that can be used for displaying information to a user, and for entering commands and data. However, in that the WLL system typically employs a conventional telephone many of these functions are lacking. By example, the interface between the telephone and the WLL system may be only a 2-wire interface, limiting the transfer of data to only those DTMF tones or pulse data that can be generated using the conventional telephone keypad. As such, in many cases it is difficult or impossible for a user to interact with the WLL system so as to view displayed information and/or enter data and commands. By example only, one feature that is difficult to implement is an ability to set call restrictions for outgoing calls.

Commonly assigned Finnish patent application FI 964425, filed Apr. 11, 1996, discloses a WLL system that addresses at least some of these problems, wherein character-based information can be processed and displayed to a user on an attached printing device, such as a facsimile machine.

In many conventional public switched telephone network (PSTN) systems it is possible to automatically reject or inhibit certain outgoing calls. This type of operation is typically implemented in the network as a value-added service, for example in the local exchange, and may be activated by the user entering a certain key sequence (e.g., "*21#"). Predefined key sequences can be used to perform other functions, such as the diversion of incoming calls. However, the inventors are not aware of any current PSTN systems that enable the selective rejection of incoming calls. At present, the only recourse that a user or subscriber has to limit or restrict incoming calls is to obtain an unlisted or "secret" telephone number, or to simply leave the phone off hook. However, neither of these solutions is optimum, as important calls and messages can be missed.

OBJECTS AND ADVANTAGES OF THE INVENTION

It is a first object and advantage of this invention to provide an improved WLL system that overcomes the foregoing and other problems.

It is a second object and advantage of this invention to provide a WLL system that is constructed to have an improved user interface.

It is one further object and advantage of this invention to provide a WLL system that enables a user to locally inhibit the completion of user-specified outgoing calls, and to further inhibit the completion of certain user-specified incoming calls.

SUMMARY OF THE INVENTION

The foregoing and other problems are overcome and the objects of the invention are realized by methods and apparatus in accordance with embodiments of this invention.

One purpose and utility of this invention is to provide a WLL system user with an ability for limiting both incoming and outgoing calls, without requiring any support from the underlying telephone network (e.g., the PSTN). This invention provides the user a flexible method of restricting calls, in that any single number or a number group (e.g., area code) can be stored in a rejection list using the telephone set connected to the WLL subscriber station. The user can also readily modify the restriction list(s). This invention further provides the user with an ability to selectively reject undesired incoming calls.

In accordance with this invention there is disclosed a WLL subscriber unit that includes a telephone bidirectionally coupled to a wireless transceiver through a teleadapter. The WLL subscriber unit further includes a user interface and a data processor coupled to a memory and to the user interface for prompting a user to enter information into the WLL subscriber unit, for receiving the entered information, and for storing the entered information in the memory. The data processor is responsive to the stored information for controlling the operation of the WLL subscriber unit to accept or reject at least one of specified incoming calls or outgoing calls.

In one embodiment the user interface includes a keypad of the telephone, and the information is entered by depressing keys on the telephone keypad. In another embodiment the user interface includes a speech recognition function for interpreting a user's speech as the inputted information. In a further embodiment the user interface includes a speech synthesis function for prompting the user to enter information. In yet a further embodiment the user interface includes a data port for connecting the WLL subscriber unit to an external data processor having a keyboard and a display.

In a presently preferred embodiment of this invention the memory is a non-volatile memory that stores a plurality of different lists, including an incoming call rejection list, an outgoing call rejection list, and an outgoing group call rejection list. The WLL subscriber station is responsive to a telephone number dialed by a user or received from the wireless network for comparing all or a portion of the number to at least one of the stored lists, and for rejecting a call that matches a stored telephone number or portion of a telephone number.

BRIEF DESCRIPTION OF THE DRAWINGS

The above set forth and other features of the invention are made more apparent in the ensuing Detailed Description of the Invention when read in conjunction with the attached Drawings, wherein:

FIG. 1 is block diagram of a WLL system that can be used to practice this invention;

DETAILED DESCRIPTION OF THE INVENTION

Figure 2A:
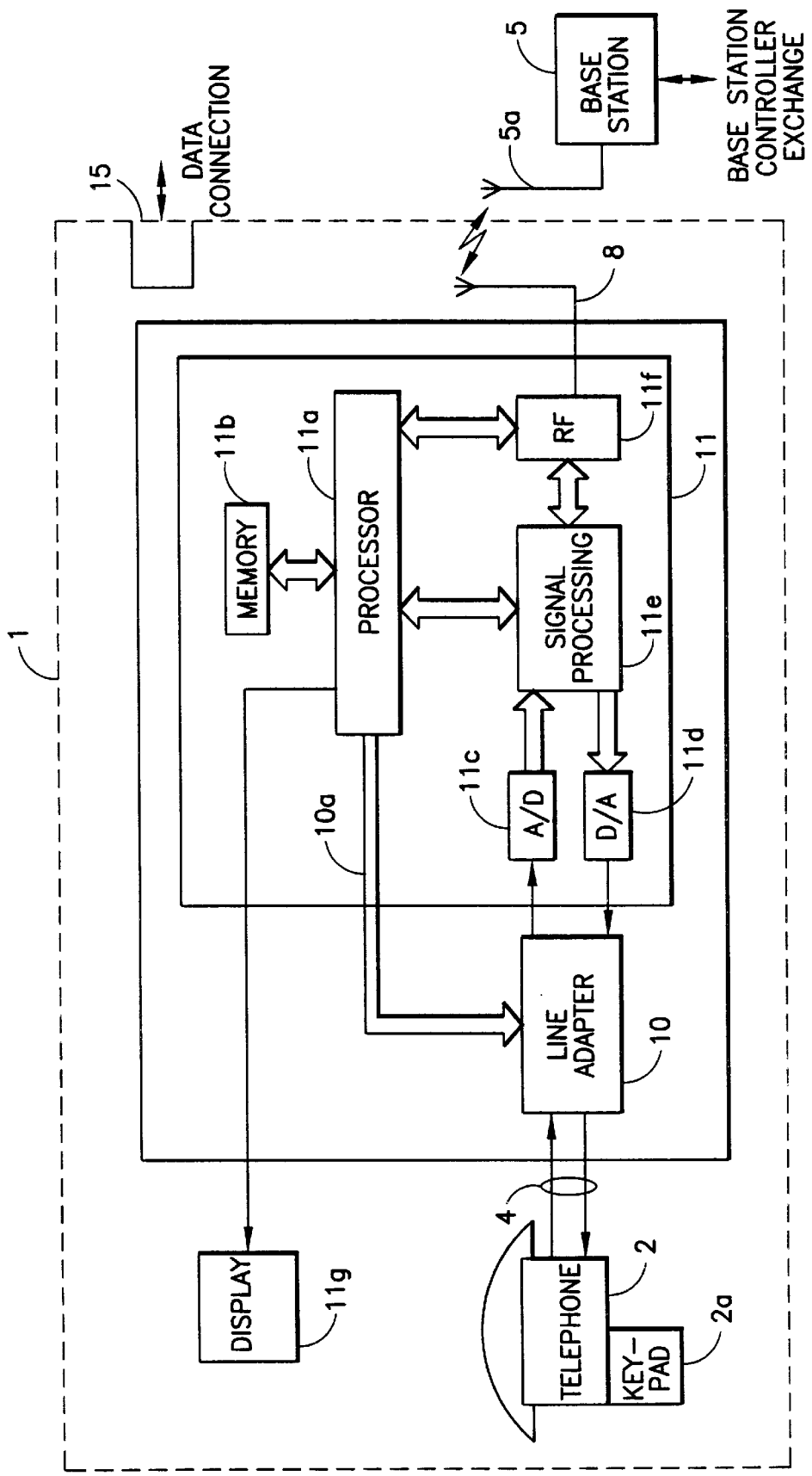
FIG. 2A is a more detailed block diagram of the WLL system of FIG. 1.

FIG. 1 illustrates a simplified block diagram of a suitable embodiment of a WLL system for practicing this invention. The WLL system shown in FIG. 1 could be based on any mobile telephone system, including both analog (FM modulated) and digital (phase modulated) mobile telephone systems. In the digital embodiment the air interface may use Time Division Multiple Access (TDMA), such as GSM and IS-136 systems, or Code Division Multiple Access (CDMA), such as IS-95. Combinations of access techniques can also be used, as can other access techniques. Base stations 5 are assumed to be operative with the signalling requirements of the air interface standard of choice. Through the base stations 5 and a subscriber network element 6 it is also possible to transmit calls to and from a conventional mobile station 9. One or more WLL systems and a plurality of conventional mobile stations may be simultaneously active within the cells served by the base stations 5.

A WLL subscriber station 1 shown in FIG. 1 includes a telephone 2 and terminal equipment 3. The telephone 2 may be a conventional telephone which could be connected to a fixed telephone network and which uses tone dialling. The telephone 2 is assumed to include a speech transducer, such as a microphone, and a speaker for making a received signal audible. The telephone 2 and the terminal equipment 3 are connected by a bidirectional path 4 through which the conventional 2-wire or 4-wire fixed telephone network signals are transmitted. The terminal equipment 3 includes signal processing circuits for adapting the speech path of the telephone 2 to the radio channel. The signal processing circuits include, by example, a radio portion 11 having an antenna 8 and a radio channel transceiver (TRX), as well as a teleadapter 10 for adapting the radio portion 11 to the conventional telephone 2.

The WLL subscriber station 1 is connected to one of the base stations 5 via the antenna 8 by means of radio frequency signals. A call is transmitted from the WLL subscriber station 1 via a base station 5 to the subscriber network element 6 and then to an exchange of a Public Switched Telephone Network (PSTN), that is, to the exchange 7 of a fixed telephone network. In the case of FIG. 1, and by example only, the subscriber network element 6 is connected to the local exchange 7 by means of an open CCITT Q.512 V2-type multiplexer interface 12 employing a 2 Mbit/s PCM (Pulse Code Modulation) system.

FIG. 2A is a more detailed block diagram of the WLL subscriber station 1 and its connection to the data transmission system. The WLL subscriber station 1 includes the conventional telephone 2 that is adaptable to a subscriber connection of a conventional PSTN. The telephone 2 is connected to the TRX 11 via the line or teleadapter 10, through the interface 4, and includes a conventional telephone keypad 2a.

For the case of a digital radio interface, an analog signal received from the telephone 2 is converted to a digital signal using an A/D converter 11c, the digital signal is input to a signal processing unit 11e, and a transmission signal on a radio frequency is modulated with the produced signal in RF component 11f. The modulated and amplified signal is then input to the antenna 8 for transmission to the antenna 5a of the base station 5.

Similarly, a signal received on a radio frequency channel is input from the antenna 5 and provided to the RF component 11f where the signal is demodulated. A resulting digital signal output from the RF component 11f is input to the signal processing unit 11e, and the processed digital audio signal is converted to an analog signal using a D/A converter 11d. The signal processing unit 11e is programmed to implement the required transmit and receive signalling and data protocols, including voice coding, error correction, interleaving, etc., in accordance with the selected air interface standard.

For the case where the radio interface is based on analog FM modulation, the digital components of blocks 11c–11f are replaced by a suitable FM modulator for signal transmission and a suitable FM demodulator for signal reception.

A telephone for a conventional telephone network uses high voltages (e.g., 45V–60V) between the telephone and the exchange. In addition, the calling function of such a telephone is based on voltage control. In order to establish a connection the teleadapter 10 is required for interfacing the conventional telephone 2, and its accessories, to the WLL system. The teleadapter 10 produces a line voltage, tones, a ringing voltage, and indicates when the telephone handset is on/off hook. In addition, the formation of dialling signals (and other control signals) can be performed in the teleadapter 10, as can the indication of DTMF signals (see the DTMF detector 13 of FIG. 2B). The teleadapter 10 can be constructed using known circuits, such as a SLIC (Subscriber Line Interface Circuit). One SLIC suitable for this purpose is a type Am79R79 manufactured by Advanced Micro Devices. The interface 4 between the telephone 2 and the line adapter 10 typically includes two or four conductors.

The operation of the teleadapter 10 can be controlled by a microprocessor 11a though a control bus 10a. A memory 11b connected to the microprocessor 11a may be used for storing dialed connection codes, program code, temporary data, and any other information required during operation. In accordance with this invention the memory 11b also stores one or more lists of restricted incoming calling numbers, outgoing calling numbers, and outgoing group numbers, as described in further detail below. The program code stored in the memory 11b furthermore implements a WLL system user interface in accordance with this invention.

A user display device 11g, such as an LCD mounted at a location that is convenient to the user, is also controlled by the processor 11a, and is used to present information and prompts to a user of the WLL subscriber station in accordance with the methods of this invention, as described below.

Figure 2B:
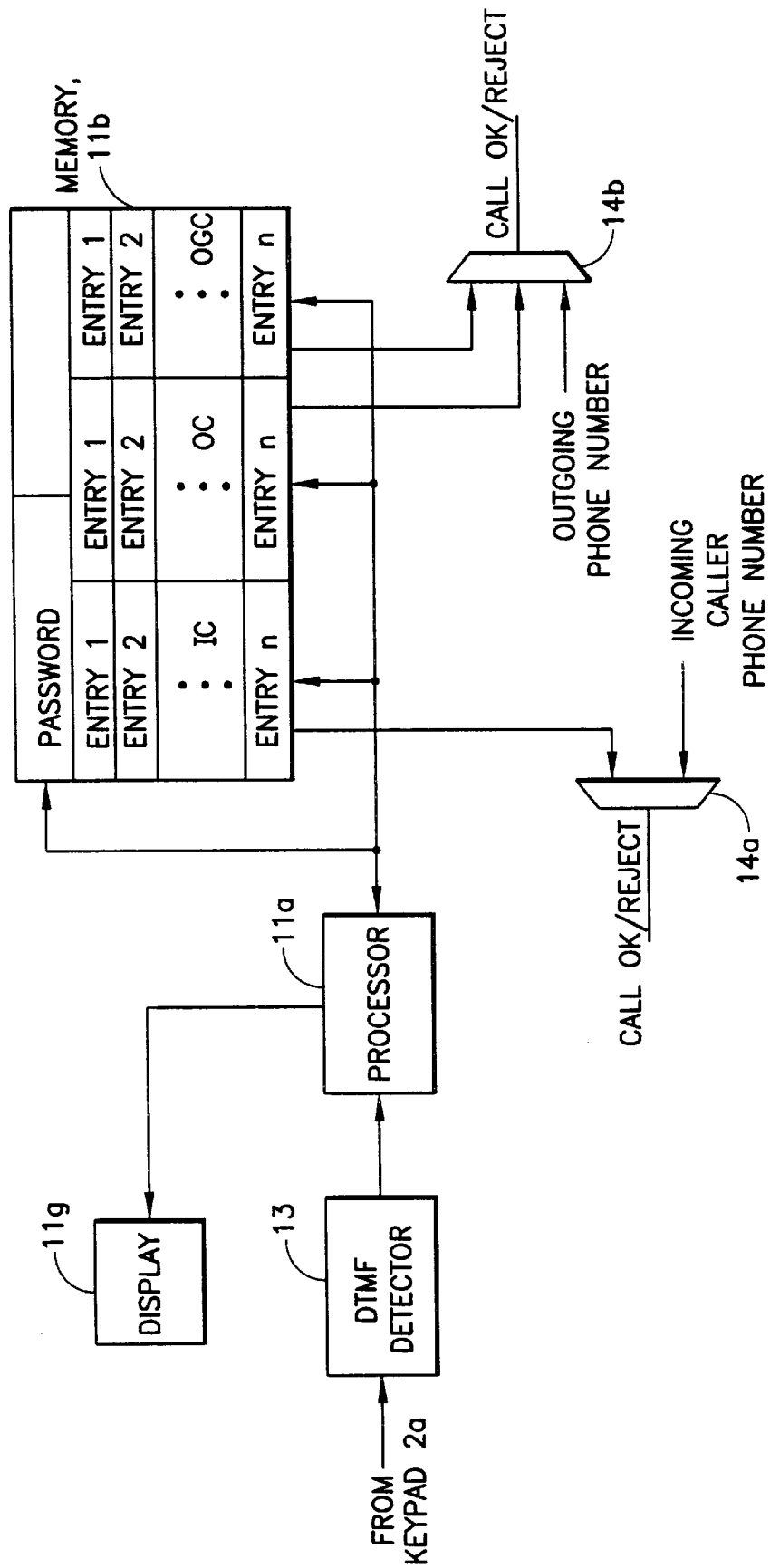
FIG. 2B illustrates the memory and associated components of FIG. 2A in greater detail.

Referring also now to FIG. 2B, in accordance with this invention one or more lists of user-specified phone numbers and (optionally) corresponding names are stored in a non-volatile portion of the memory 11b, each list comprising from 1 to n entries. There are preferably three types of lists: one for incoming calls (IC), one for outgoing calls (OC), and one for outgoing group calls (OGC). When the WLL terminal 1 receives a call, the caller's telephone number, which is received in the signalling from the base station 5, is checked with a comparator function 14a against the incoming call reject list. The incoming call is rejected if the caller's phone number matches a number stored in the incoming call rejection list, otherwise the call proceeds normally. The call can be rejected by sending a message, using the applicable air interface protocol, to the base station 5. By example, the processor 11a may simply send a call termination message. The user may optionally be notified that the call was rejected, and the caller's number (and/or name if stored in the incoming call rejection list) displayed to the user. Alternatively, the call is simply rejected and the user need not be made aware of the rejected incoming call.

When a call is made from the WLL terminal 1, the user-entered phone number is checked using a comparator function 14b against the outgoing call reject list and the outgoing group call reject list. If the number exists in either list the call is rejected, otherwise the call proceeds normally. In the outgoing group list only a portion of a telephone number may be present, such as a portion indicating that the restricted call group is international calls (e.g., prefix 011), or non-local calls (e.g. prefix 1), or calls to certain area codes (e.g. prefix 1-900). When the outgoing call is rejected the processor 11a may simply not send a call origination message to the base station 5.

The management of the call rejection lists, using the processor 11a, display 11g, telephone keypad 2a, and a DTMF detector 13, is described below.

Figure 3:
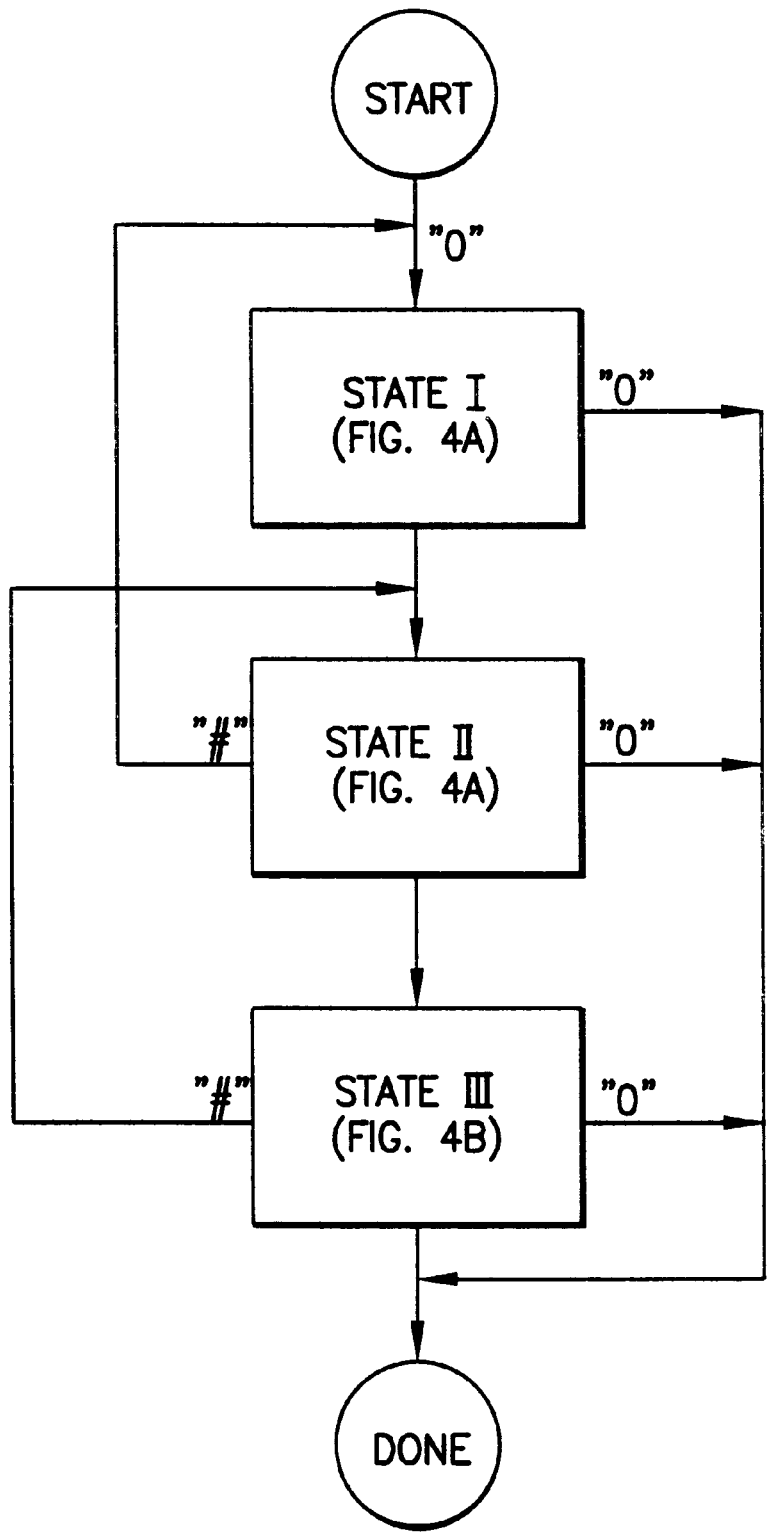
FIG. 3 is a flow chart that illustrates a method in accordance with this invention.
Figure 4A:
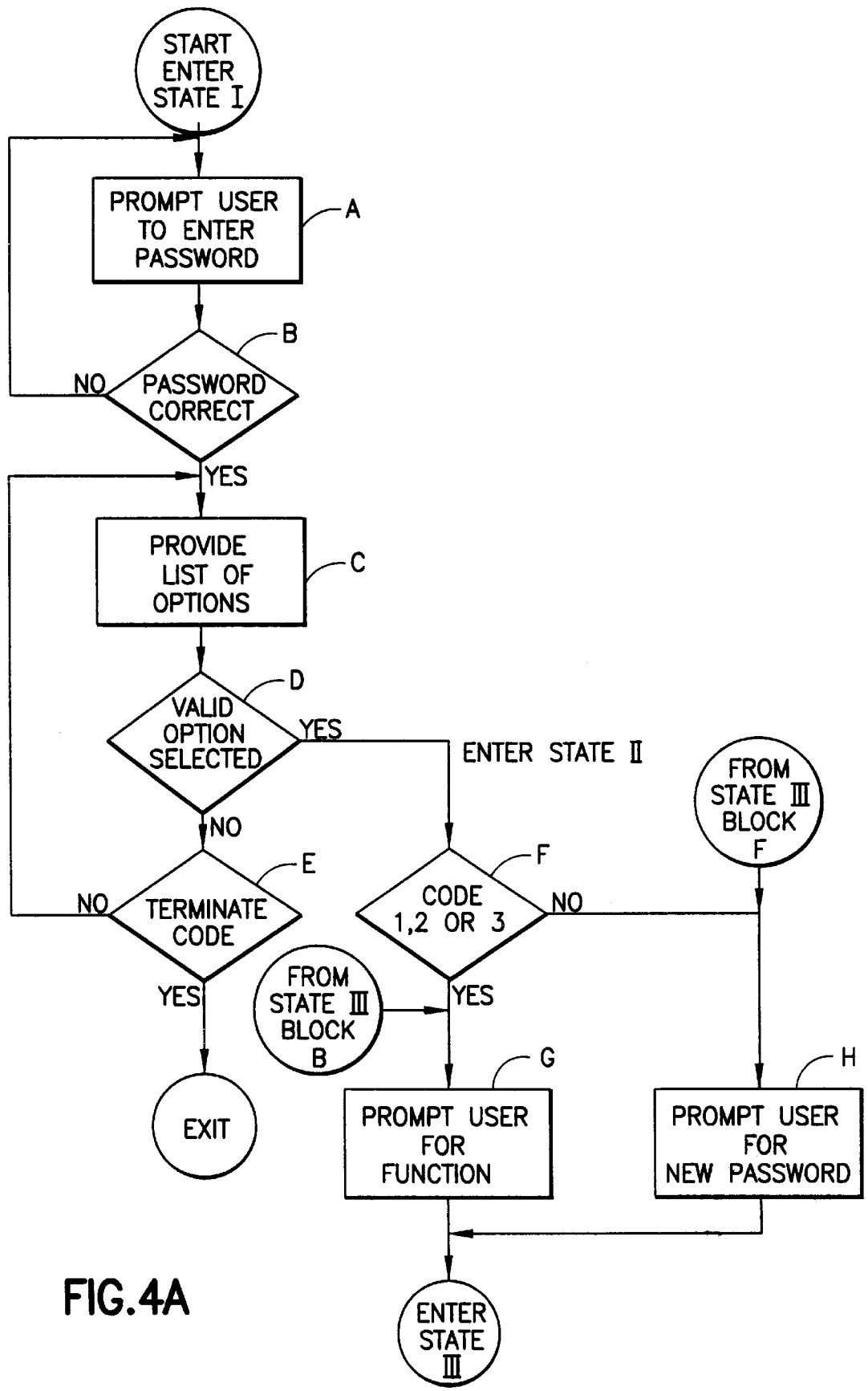
FIGS. 4A and 4B are flow charts that illustrate in greater detail the method of FIG. 3.
Figure 4B:
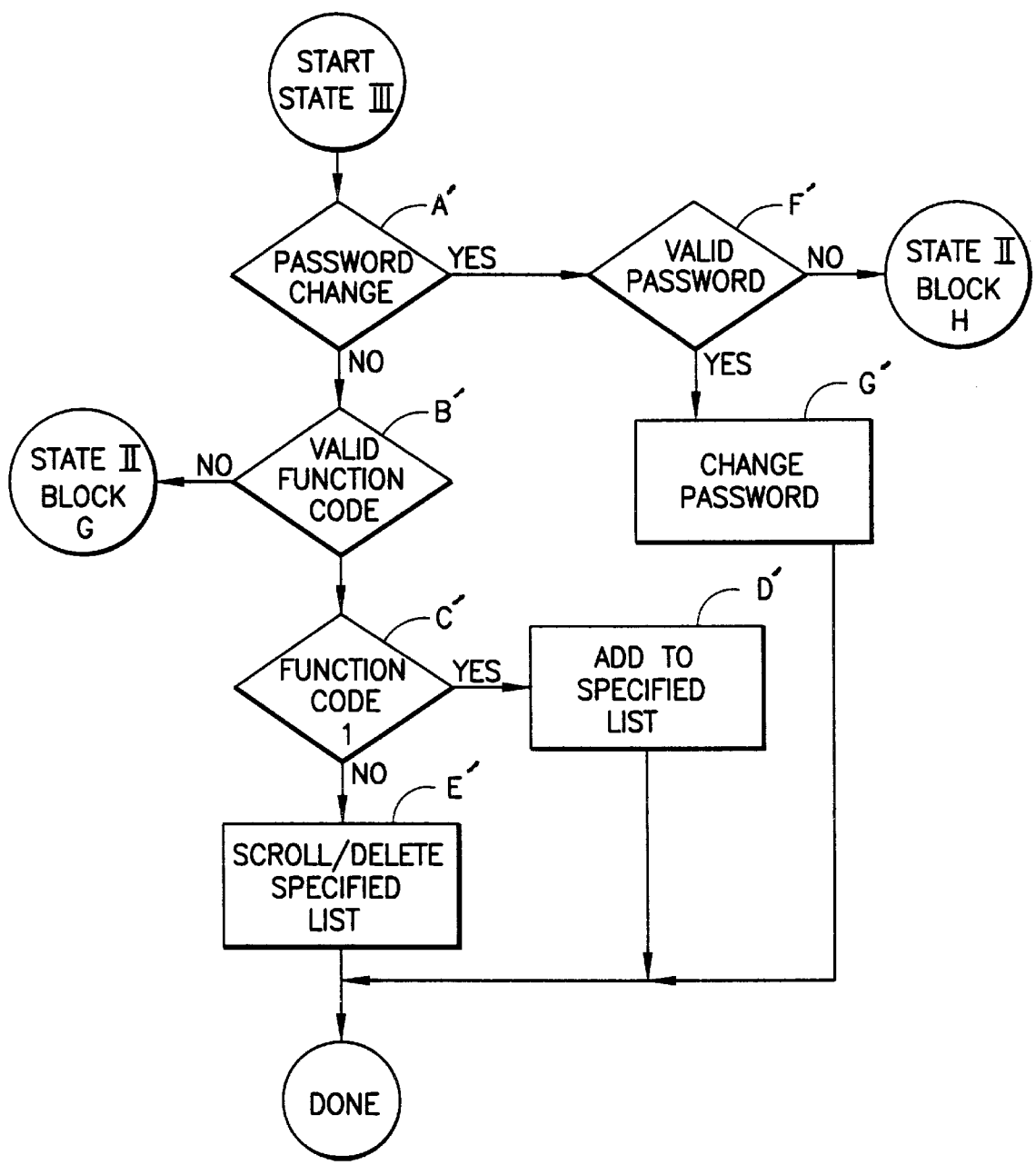

Reference is now made to FIGS. 3, 4A and 4B for illustrating a presently preferred embodiment of a method of this invention.

Referring first to FIG. 3, when the user depresses and holds a predetermined telephone keypad key (e.g., the "0" key) longer than a predetermined minimum time (e.g., three seconds), the WLL terminal 1 enters a programming mode having three states (States I, II and III). While in one of the states the depression and holding of the "0" key causes an exit from the state and terminates the method. When in the States II and III, if another predetermined key (e.g., the "#" key) is depressed, the method loops back to the beginning of the previous state. The operation of the method in each of these states is illustrated in FIGS. 4A and 4B.

Referring first to FIG. 4A, the State I is comprised of Blocks A–E, while the State II is comprised of Blocks F–H. At Block A the user is prompted to enter a security code or password. The entered password is then checked in Block B and, if the password matches a previously stored password in the memory 11b, the method enters Block C, otherwise a return is made to Block A to prompt the user to reenter the password. This return loop may be executed some predetermined number of times (e.g., three times), after which the method terminates automatically.

Assuming that the user has entered a valid password, at Block C a list of options is provided to the user. In the first state of the programming mode the user selects which function is to be programmed. The programmable functions include changing the password, modifying (or scanning) the incoming call restriction list, modifying (or scanning) the outgoing call restriction list, or modifying (or scanning) the outgoing call group restriction list. By example, depressing the "1" key selects the incoming call rejection list, depressing the "2" key selects the outgoing call rejection list, depressing the "3" key selects the outgoing group call rejection list, and depressing the "4" key selects the password changing function. At Blocks D and E the user's input is checked to determine if a valid option code has been entered, and to see if the programming mode has been terminated (deactivated) by the user. If a valid option code is not entered (e.g., the user does not enter a number between 1 and 4, or the terminate code ("0")), the method loops back to Block C to provide the list of options once again. Assuming that the user has entered a valid option code, the option code is stored in temporary memory, and the method enters Block F (State II). At Block F the entered option code is tested to determine if the user desires to operate on one of the call restriction lists, or if the user desires to change the password. If the former, the method enters Block G to prompt the user for a call restriction list function, otherwise the method enters Block H to prompt the user for a new password. The method then enters State III.

In greater detail, and assuming that the user has entered one of the numbers "1", "2", or "3" at Block D to select one of the three call restriction lists, the processor 11a displays in Block G suitable message on the display 11g, such as the text "ADD, REMOVE, OR SCAN?".

As was indicated above, if the user presses the predetermined key (e.g., "#") the processor 11a returns the WLL terminal to the first programming state. If the user instead re-enters and holds the activation key (i.e., "0"), the programming mode is terminated. These steps are not shown in the State II logic of FIG. 4A.

Referring to FIG. 4B, at Block A' the method determines if the user entered a "4" at Block F of FIG. 4A to designate the password changing function. If yes, control passes to Block F' of FIG. 4B, otherwise control passes to Block B' of FIG. 4B.

At Block B' a test is made to determine if the user entered a valid function code at Block G of FIG. 4A. If not, control passes back to Block G to prompt the user for another function code by displaying the text "ADD, REMOVE, OR SCAN?". If a valid function code was entered, control passes to Block C' to determine if the code is a "1" (i.e., ADD to the call restriction list specified by the user at Block D of FIG. 4A). Depressing the "1" key puts the WLL terminal 1 into a phone number and optional name adding state (Block D'). In the display 11g an underlined character cursor begins flashing and the processor 11a goes to the end of the selected call restriction list (i.e., the next available location). Using the keypad of the telephone 1 the user is enabled to enter a name (optional if an alpha mode is supported) and the associated telephone number, which are also displayed on the display 11g as they are entered. By example, if the selected list is the outgoing group call list, the beginning of the selected phone number(s) (e.g., the prefix 1-900) can be entered and displayed. Depressing a predetermined key (e.g., "*") causes the processor 11a to store the displayed telephone number (and optional text) in the portion of the non-volatile memory 11b that is allocated to the previously selected call restriction list. After storing the entered number and optional text, the next available location can then be programmed in the same manner. Depressing the hash key (e.g., "#") instead returns the WLL terminal 1 to the second state of the programming mode, while depressing and holding the "0" key causes the method to terminate.

If at Block C' of FIG. 4B it is determined that the keypad generated DTMF tone did not correspond to the "1" key, then it is assumed that the user entered a "2" (REMOVE) or a "3" (SCAN). In either case control passes to Block E' to perform a scroll function. The first phone number and optional name of the previously selected call restriction list is displayed to the user on the display 11g. By again pressing the "2" key the next phone number and optional name of that list is displayed in a scroll-down fashion, while pressing another key (e.g., "3") causes the display to instead scroll-up, and display the previous phone number and optional name, or the last name and number if at the top of the list. In this manner the user is enabled to scroll through the selected call restriction list and review the stored entries in turn. If the user instead depresses the "*" key, the currently displayed phone number and optional name are deleted from the selected call rejection list by the processor 11a, and the next phone number and optional name (if any) are then moved up in the selected list. Pressing the "#" key returns the WLL terminal 1 to the second state of programming mode.

Each call restriction list may be implemented as a linked list in the memory 11b. In this case the addition and deletion of numbers and optional text may be performed using known types of linked list processing algorithms.

Referring to Block F' of FIG. 4B, the password that was previously entered at Block H of FIG. 4A is checked to determine if it is a valid password (e.g., a correct number of digits without any non-numeric characters). If the user did not enter a password having a valid format, control returns to Block H of FIG. 4A to prompt the user to reenter the password. If the password validity test passes at Block F', control passes to Block G' to store the new password in the memory 11b, and the method terminates.

Although described above in the context of using the telephone keypad 2a as the means to enter user information to the WLL system 1, it is also within the scope of this invention to provide a data communications adapter 14, such as an RS-232 port 15 (FIG. 2A), and to program the WLL terminal from an attached PC and/or network. In this case the display of the PC can be used in lieu of the display 11g. Also in this case the attached PC is assumed to include application software for interfacing with the processor 11a of the WLL system 1.

Figure 2C:
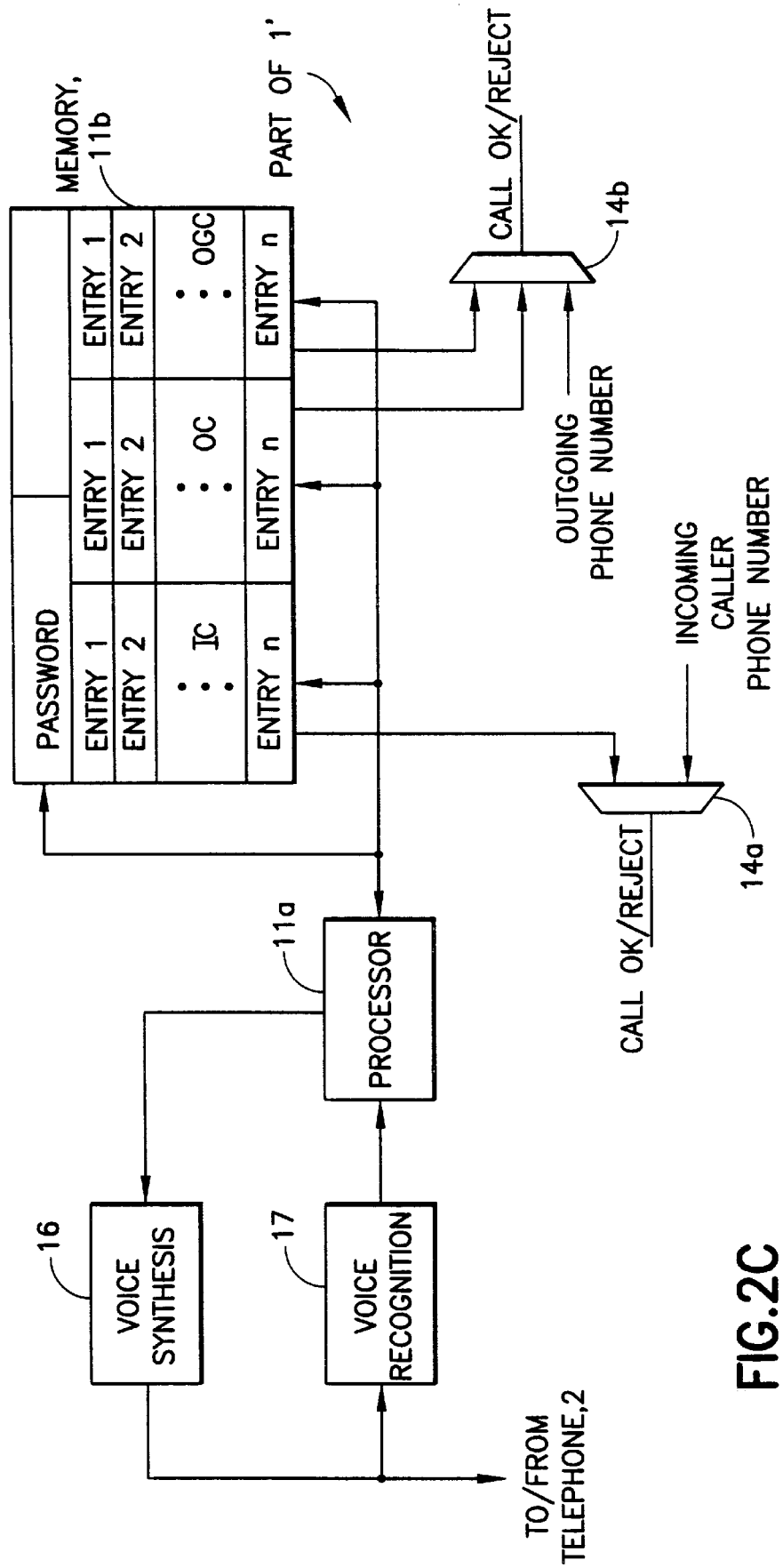
FIG. 2C is a simplified block diagram of a WLL system that utilizes a voice synthesis function and a voice recognition function to provide a user interface.

It is also within the scope of this invention to provide a voice recognition function in the WLL system 1, and to use recognized words uttered by the user to access and modify the call restriction lists. Along the same lines the WLL terminal 1 may generate audible voice prompts using speech synthesis, and to thereby reduce or eliminate the requirement for the display 11g. For a system employing both voice recognition and voice synthesis, the programming of the WLL system 1 for call restrictions and/or other functions can be achieved using only the audio capability of the telephone 2 as the user interface. FIG. 2C is a simplified block diagram of such a WLL system 1' that is constructed to include a voice synthesis block 16 and a voice recognition function 17.

It should also be realized that some of the steps shown in FIGS. 4A and 4B could be executed in other than the order shown, while still achieving the same or substantially the same result. Also, other steps could be added or steps could be deleted or combined.

It should further be realized that all three call rejection lists need not be used. By example, the outgoing group call list may not be used or programmed. It is also within the scope of this invention to modify the programming method described above to enable a user to selectively enable and disable the use of one or more of the call restriction lists. By example, the user may be enabled to set a flag that effectively causes an associated call restriction list to be ignored (disabled) until the flag is subsequently reset.

It is also within the scope of this invention to use an attached facsimile machine or a printer as the display 11g.

Thus, while the invention has been particularly shown and described with respect to preferred embodiments thereof, it will be understood by those skilled in the art that changes in form and details may be made therein without departing from the scope and spirit of the invention.

What is claimed is:

1. A method for controlling an operation of a wireless local loop subscriber unit, comprising the steps of:

prompting a user to enter information into the wireless local loop subscriber unit;

in response to the prompt, entering information into the wireless local loop subscriber unit;

storing the entered information in the wireless local loop subscriber unit; and controlling the operation of the wireless local loop subscriber unit to accept or reject at least one of specified incoming calls or outgoing calls in accordance with the stored information, wherein the step of storing stores the inputted information in one of a plurality of different lists, comprising an incoming call rejection list, an outgoing call rejection list, and an outgoing group call rejection list.

2. A wireless local loop subscriber unit as in claim 1, wherein said memory is a non-volatile memory that stores a plurality of different lists, comprising an incoming call rejection list, an outgoing call rejection list, and an outgoing group call rejection list.

3. A method as in claim 1, wherein the step of entering includes a step of entering a telephone number for specifying an incoming caller's telephone number that is to be rejected.

4. A method as in claim 1, wherein the step of entering includes a step of entering a telephone number for specifying an outgoing telephone number that is to be rejected.

5. A method as in claim 1, wherein the step of entering includes a step of entering a portion of a telephone number for specifying a group of outgoing telephone numbers that are to be rejected.

6. A method as in claim 1, wherein the step of entering includes the steps of:

depressing keys on a telephone keypad; and interpreting the depressed keys as the inputted information.

7. A method as in claim 1, wherein the step of entering includes the steps of:

speaking into a telephone speech transducer; and interpreting the speech as the inputted information.

8. A method as in claim 1, wherein the step of prompting includes a step of displaying information to the user.

9. A method as in claim 1, wherein the step of prompting includes the steps of:

generating a speech signal in the wireless local loop subscriber unit; and making the speech signal audible in a telephone speaker.

10. A method as in claim 1, wherein the entered information includes alphanumeric characters comprised of numbers and text.

11. A method as in claim 1, wherein the entered information includes a password.

12. A wireless local loop subscriber unit as in claim 2, wherein said user interface is comprised of a keypad of said telephone, and wherein the information is entered by depressing keys on said telephone keypad.

13. A wireless local loop subscriber unit as in claim 2, wherein said user interface is comprised of a speech recognition function for interpreting a user's speech as the inputted information.

14. A wireless local loop subscriber unit as in claim 2, wherein said user interface is comprised of a speech synthesis function for prompting the user to enter information.

15. A wireless local loop subscriber unit as in claim 2, wherein said user interface is comprised of a data port for connecting said wireless local loop subscriber unit to an external data processor.

* * * * *